US010642872B2

(12) United States Patent
Frosst

(10) Patent No.: US 10,642,872 B2
(45) Date of Patent: May 5, 2020

(54) SYSTEM FOR OPTIMIZING CONTENT QUERIES

(71) Applicant: salesforce.com, inc., San Francisco, CA (US)

(72) Inventor: Ian Frosst, Nova Scotia (CA)

(73) Assignee: SALESFORCE.COM, INC., San Francisco, CA (US)

( * ) Notice: Subject to any disclaimer, the term of this patent is extended or adjusted under 35 U.S.C. 154(b) by 460 days.

(21) Appl. No.: 15/299,642

(22) Filed: Oct. 21, 2016

(65) Prior Publication Data

US 2018/0113930 A1    Apr. 26, 2018

(51) Int. Cl.
  *G06F 16/00* (2019.01)
  *G06F 16/31* (2019.01)
  *G06F 16/93* (2019.01)
  *G06F 16/22* (2019.01)
  *G06F 16/33* (2019.01)

(52) U.S. Cl.
  CPC ........ *G06F 16/316* (2019.01); *G06F 16/2246* (2019.01); *G06F 16/3344* (2019.01); *G06F 16/93* (2019.01)

(58) Field of Classification Search
  CPC .......... G06F 17/30867; G06F 17/3053; G06F 17/30861; G06F 17/30911; G06F 17/2247; G06F 17/30011; G06F 17/30247; G06F 17/30625; G06F 17/30657; G06F 17/3066; G06F 17/3069; G06F 17/30707; G06F 17/30622; G06F 17/30864; G06F 17/30938
  See application file for complete search history.

(56) References Cited

U.S. PATENT DOCUMENTS

| 5,386,556 | A | * | 1/1995 | Hedin ................ G06F 17/271 |
| 5,577,188 | A |   | 11/1996 | Zhu |
| 5,608,872 | A |   | 3/1997 | Schwartz et al. |
| 5,649,104 | A |   | 7/1997 | Carleton et al. |
| 5,715,450 | A |   | 2/1998 | Ambrose et al. |
| 5,761,419 | A |   | 6/1998 | Schwartz et al. |
| 5,819,038 | A |   | 10/1998 | Carleton et al. |
| 5,821,937 | A |   | 10/1998 | Tonelli et al. |
| 5,831,610 | A |   | 11/1998 | Tonelli et al. |
| 5,873,096 | A |   | 2/1999 | Lim et al. |

(Continued)

*Primary Examiner* — Yicun Wu
(74) *Attorney, Agent, or Firm* — Schwabe Williamson & Wyatt

(57) ABSTRACT

An indexing scheme generates a token index associating token index values with keywords in queries and generates expression trees for the queries that use the token index values to represent the keywords. The indexing scheme generates a document index assigning document index values to uploaded documents. The indexing scheme generates a document-token index that associates the token index values with the document index values for the documents containing the keywords associated with the token index values. The indexing scheme applies the expression trees to the document-token index to quickly identify the documents satisfying the queries. For example, the indexing scheme may generate bit arrays for each of the token index values identifying the documents containing the keywords and apply logical operators from the queries to the bit arrays. The resulting data structure provides a list of documents satisfying the queries.

20 Claims, 6 Drawing Sheets

(56) References Cited

U.S. PATENT DOCUMENTS

| | | |
|---|---|---|
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |

(56) References Cited

U.S. PATENT DOCUMENTS

| | | |
|---|---|---|
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0089277 A1* | 4/2009 | Cheslow ............ G06F 17/30401 |
| 2009/0100342 A1 | 4/2009 | Jakobson |
| 2009/0177744 A1 | 7/2009 | Marlow et al. |
| 2010/0293174 A1* | 11/2010 | Bennett ............. G06F 17/30707 707/759 |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0164388 A1* | 6/2014 | Zhang ............... G06F 17/30911 707/742 |
| 2014/0359537 A1 | 12/2014 | Jackobson et al. |
| 2016/0055248 A1* | 2/2016 | Goel .................... G06F 17/277 707/770 |

\* cited by examiner

SYSTEM FOR OPTIMIZING CONTENT QUERIES

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

The technology relates to a system for optimizing content queries.

BACKGROUND

Monitoring systems may identify social media associated with different topics. Users may generate structured search queries that include search topics. For example, the search queries may request social media that mentions a company name or mentions names of products sold by the company. The monitoring system periodically uploads content from different social media networks and compares the social media content with the user search queries. The monitoring system then identifies any social media containing the search topics.

The monitoring system may receive queries from thousands of customers and continuously upload millions of pieces of content from different social media websites. The monitoring system continuously searches the content for hundreds of thousands of different topics identified in the search queries. Continuously searching all of the continuously incoming content uses substantial processing bandwidth. To further exasperate the problem, users generally expect social media search results in close to real-time, since the relevancy of social media often has a relatively short shelf life.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
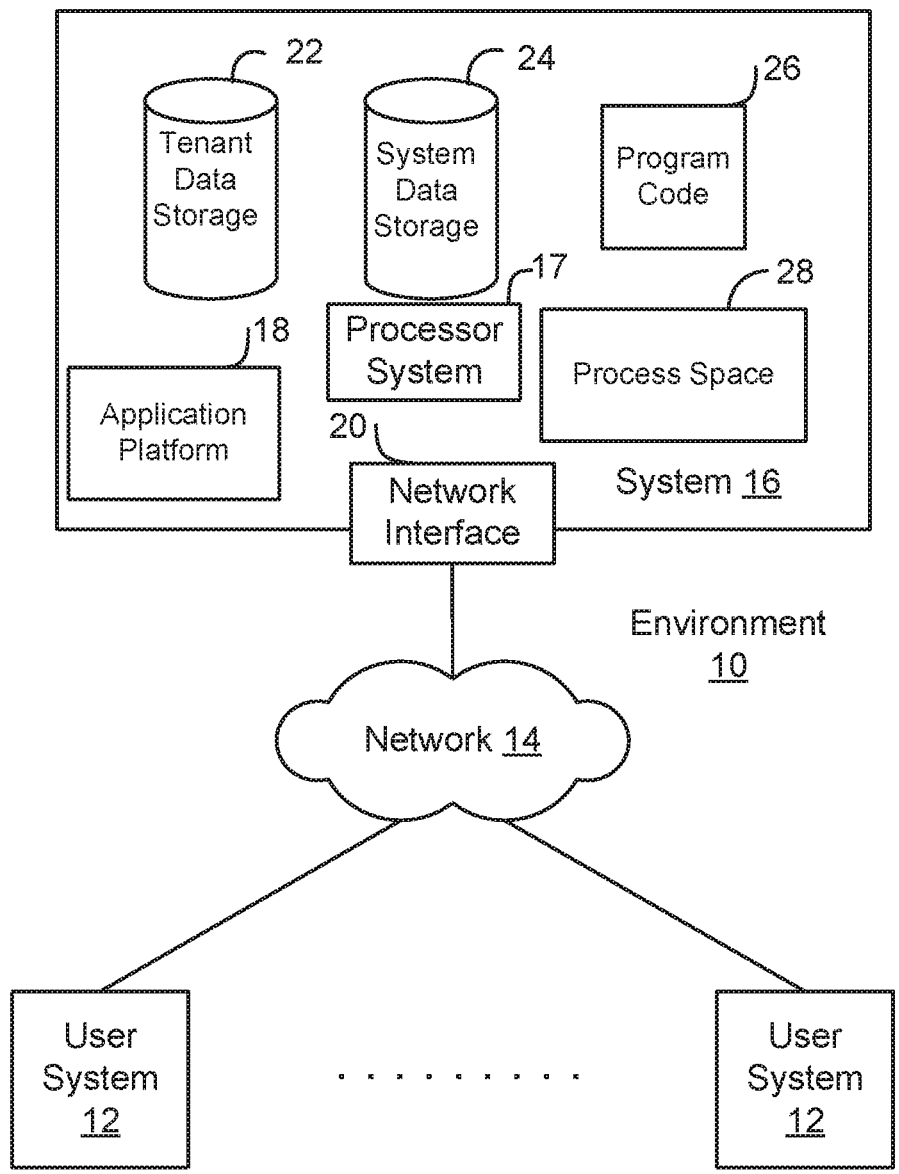
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for identifying articles helpful in resolving user queries.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
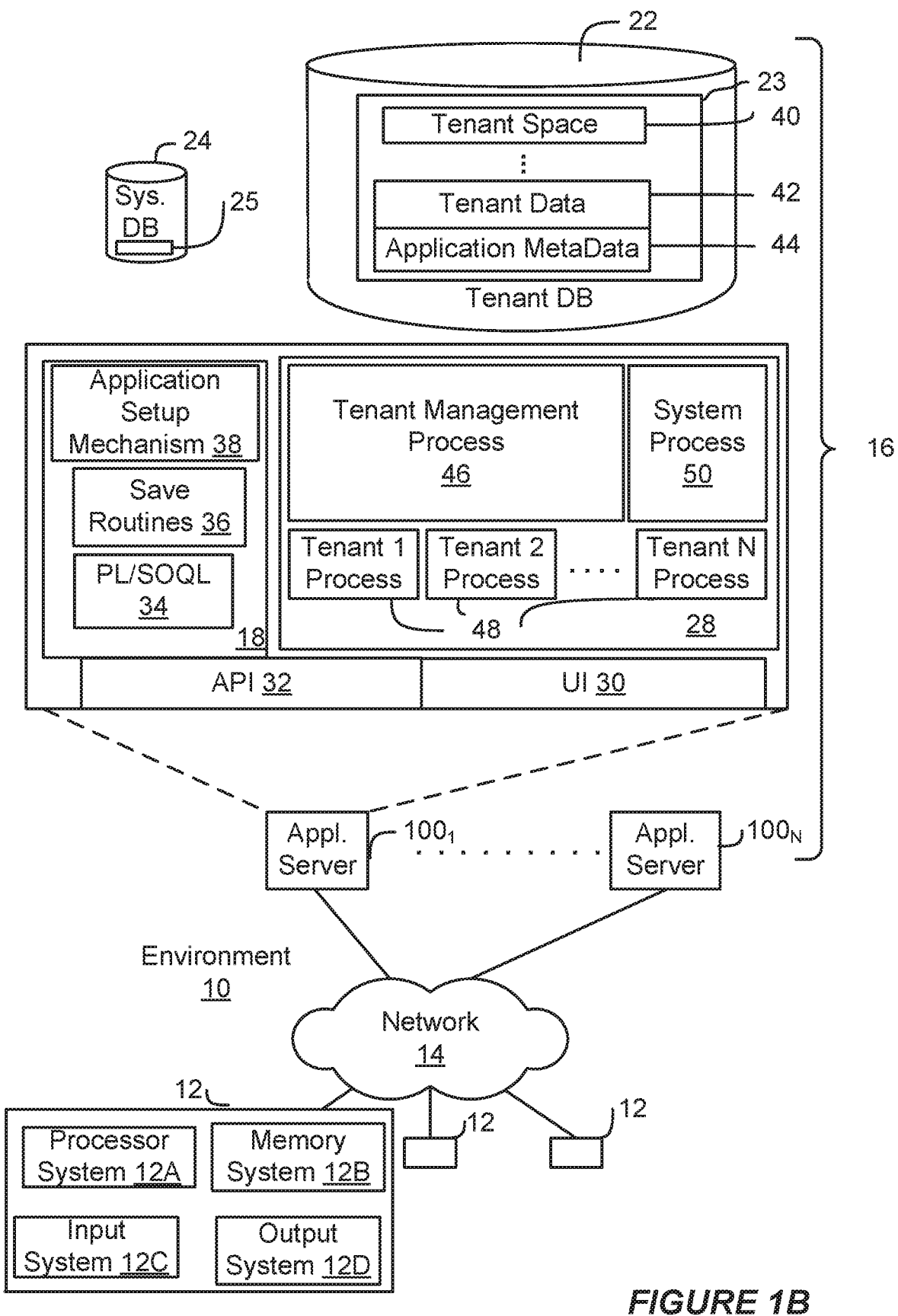
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 40, which can be physically or logically arranged or divided. Within each tenant storage space 40, user storage 42 and application metadata 44 can similarly be allocated for each user. For example, a copy of a user's most recently used (MRU) items can be stored to user storage 42. Similarly, a copy of MRU items for an entire organization that is a tenant can be stored to tenant storage space 40.

The process space 28 includes system process space 102, individual tenant process spaces 48 and a tenant management process space 46. The application platform 18 includes an application setup mechanism 38 that supports application developers' creation and management of applications. Such applications and others can be saved as metadata into tenant database 22 by save routines 36 for execution by subscribers as one or more tenant process spaces 48 managed by tenant management process 46, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 44 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100.

In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. System for Optimizing Content Queries

An indexing scheme efficiently identifies documents associated with document queries. The indexing scheme may receive queries including query expressions. The indexing scheme generates a token index associating token index values with keywords in the query expressions. The search platform then generates expression trees that use the token index values to represent the keywords.

A database system may constantly upload documents from different data sources. The indexing scheme generates a document index assigning document index values to the documents. The indexing scheme generates a document-token index that associates the token index values with the document index values for the documents containing the keywords associated with the token index values. The indexing scheme applies the token index values in the expression trees to the document-token index to quickly identify documents satisfying the query expressions.

The indexing scheme may generate bit arrays for each of the token index values, where each bit location in the bit array is associated with a different one of the documents and bit values in the bit locations identify which of the documents contain the keywords associated with the token index values. The indexing scheme applies logical operations from the query expressions to the bit arrays. The resulting data structure provides a list of documents satisfying the query expressions.

The indexing scheme may identify all of the documents satisfying a query expression in one Boolean operation reducing processing bandwidth usage and increasing scalability so more content can be searched for a larger number of queries.

Figure 2:
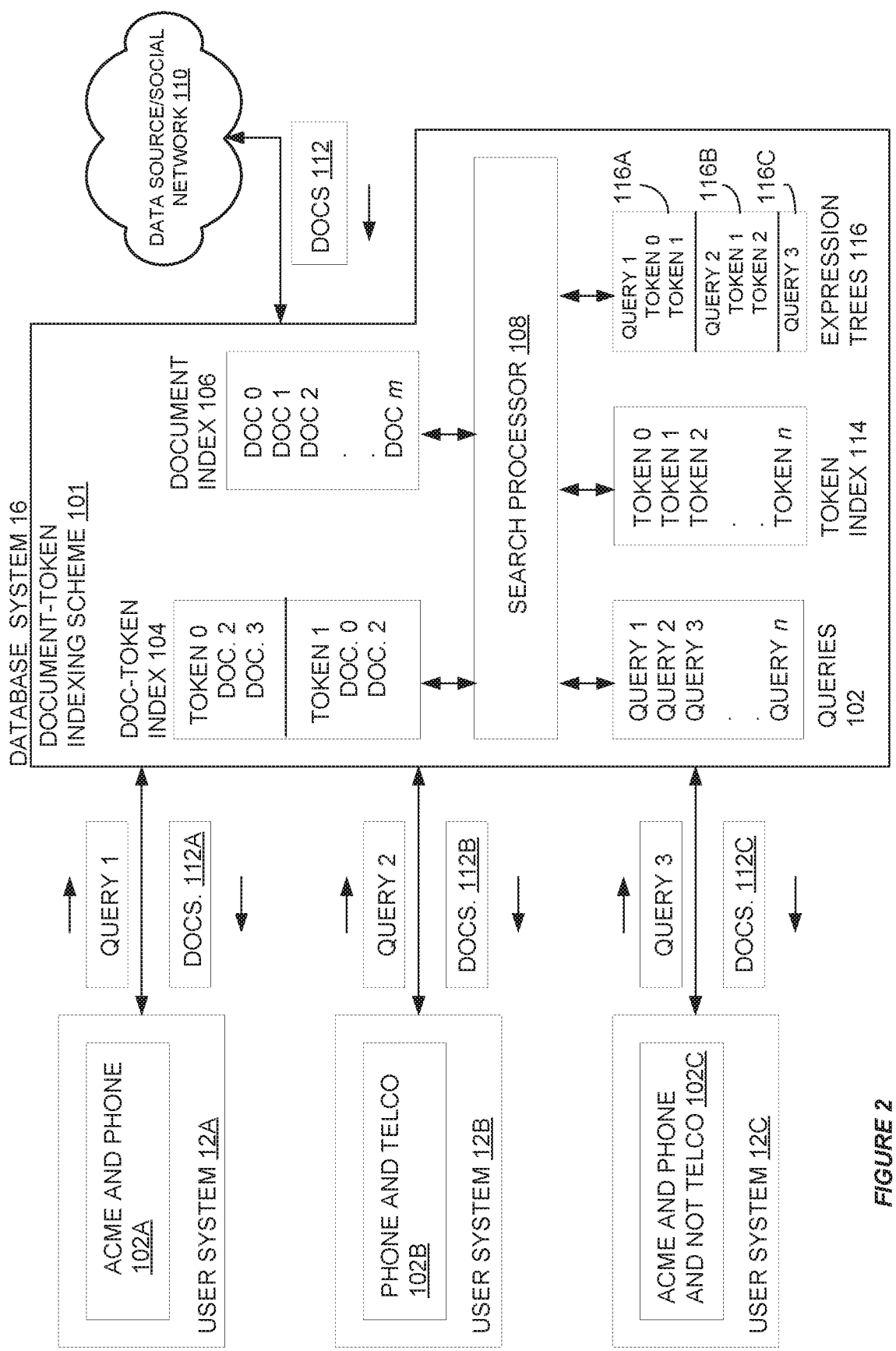
FIG. 2 shows an example document-token indexing scheme.

FIG. 2 shows on example document-token indexing scheme 101 operating within database system 16 for optimizing content queries. Users on different user systems 12 may create different queries 102 for locating documents. For example, a user on user system 12A may create a first query 102A (query 1) that directs indexing scheme 101 to supply documents containing the keywords ACME and PHONE. A user on user system 12B may create a second query 102B (query 2) that directs indexing scheme 101 to supply documents containing the keywords PHONE and TELCO, and a user on user system 12C may create a third query 102C (query 3) directing indexing scheme 101 to supply documents containing the keywords ACME and PHONE, and not TELCO. In another example, queries 102 may include requests for documents that include one or more hashtags. Of course there could be any number of queries generated by any number user systems 12 that include any combination of keywords and logic operators.

Database system 16 may operate a search processor 108 that receives queries 102 from user systems 12. Search processor 108 converts the keywords from queries 102 into a token index 114. In one example, token index 114 includes a sequential list of token index values, numbers, or address locations associated with each sequential unique keyword in queries 102.

For example, search processor 108 may assign first ACME keyword in query 102A address location 0 (Token 0) in token index 114 and assign second PHONE keyword in query 102A address location 1 (Token 1). Search processor 108 may assign first PHONE keyword in query 102B address location 1 (Token 1) and assign the next unique TELCO keyword in query 102B a next sequential address location 2 (Token 2) in token index 114.

Search processor 108 may use token index values T0-Tn to create expression trees 116 representing queries 102. For example, expression tree 116A for query 102A may use tokens T0 and T1 as nodes linked together via a logical AND operator.

Database system 16 may periodically upload documents 112 from one or more data sources 110. In one example, documents 112 may include messages, electronic documents, text, pictures, audio, or any other type of content posted or stored on any social network. Pictures and audio may be converted into text and then processed by indexing scheme 101. However, documents 112 may include any other type of content stored on any data source 110. Database system 16 may use application program interfaces (APIs) to continuously and/or periodically access and upload documents 112 from data sources 110. Database system 16 also may receive documents 112 from third party data accumulation sources.

Search processor 108 generates a document index 106 for documents 112. In one example, document index 106 includes a sequential list of document numbers or address locations D0-Dm associated with each received document 112. For example, search processor 108 may assign a first document 112 address location 0 (Doc 0) in document index 106, assign a second document 112 address location 1 (Doc 1) in document index 106, etc.

Search processor 108 uses token index 114 and document index 106 to generate an inverted document-token index 114 identifying documents associated with different query keywords. For example, search processor 108 may tokenize individual words in documents 112. If a word in a document 112 contains one of the keywords in queries 102, search processor 108 assigns the document index value for that document 112 to the token index value associated with that keyword.

For example, document Doc 2 and document Doc 3 may include the ACME keyword. Search processor 108 assigns document index values Doc 2 and Doc 3 to token index value Token 0 associated with the ACME keyword. Doc 0 and Doc 2 may include the PHONE keyword from queries 102A, 102B, and 102C. Search processor 108 assigns document index values Doc 2 and Doc 3 to token index value Token 1 associated with the PHONE keyword.

Search processor 108 may use document-token index 104 to quickly identify documents 112 containing query keywords. For example, first query 102A includes keyword ACME. Token index 114 associates ACME with Token 0. Search processor 108 may access the first address location in document-token index 104 to quickly identify in one operation document index values D2 and D3 for documents 112 that include the ACME keyword.

Search processor 108 applies expression trees 116 to document-token index 104 to identify documents 112 satisfying associated queries 102. For example, search processor 108 identifies the token index values in expression trees 116 and identifies any documents including the token index values and satisfying logical operations in the expression trees. Search processor 108 then sends the identified documents 112 to the user system 12 sending the associated query 102. For example, search processor 108 may send user system 12A documents 112A satisfying expression tree 116A for query 102A. Similarly, search processor 108 may send all documents 112B satisfying expression tree 116B to user system 12B, and send docs 112C satisfying query 102C to user system 12C.

Database system 16 may periodically upload additional documents 112 from data sources 110. Search processor 108 may rebuild document index 106 to include the new documents and use token index 114 and rebuilt document index 106 to rebuild document-token index 104. Search processor 108 then may supply new sets of documents 112A 112B, and 112C to user systems 12A, 12B, and 12C, satisfying expression trees 116A, 116B, and 116C, respectively. Search processor 108 also may update token index 14, expression trees 116, and document-token index 104 based on changes to queries 102.

Figure 3:
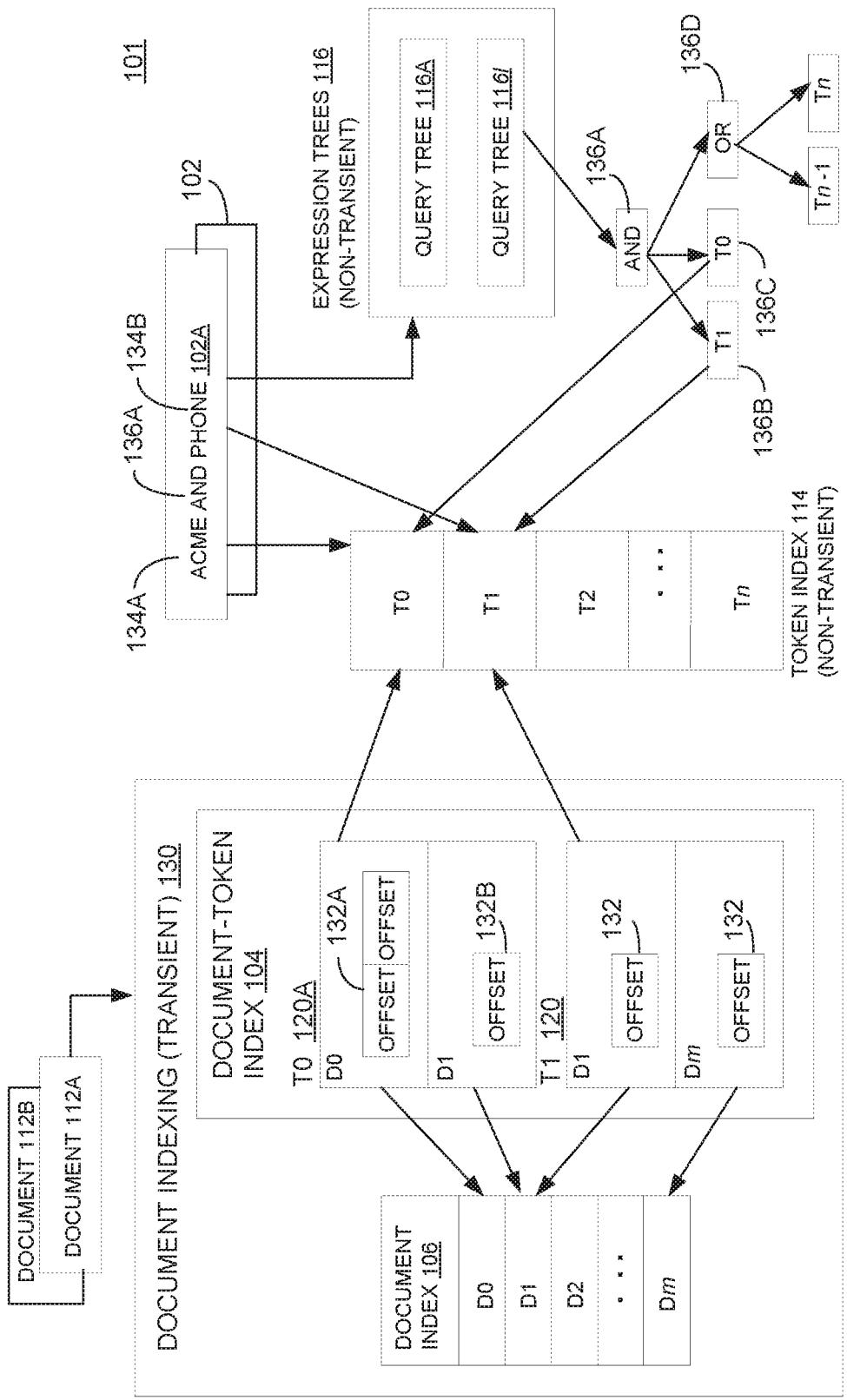
FIG. 3 shows the document-token indexing scheme of FIG. 2 in more detail.

FIG. 3 shows document-token indexing scheme 101 in more detail. Indexing scheme 101 generates token index 114 from queries 102 as described above. For example, a first query 102A may include keywords 134A and 134B and a logical operator 136A. Indexing scheme 101 may assign sequential token index values to keywords 134A and 134B. For example, indexing scheme 101 may assign a zero or first address value T0 to keyword 134A and assign a one or next address value T1 to keyword 134B.

Indexing scheme 101 may assign previously indexed keywords the same previously assigned token index values and assign additional unique not previously indexed keywords the next sequential token index values in token index 114. For example, the PHONE keyword for query 102B in FIG. 2 is assigned token index value T1 and the TELCO keyword for query 102B is assigned token index value T2

After assigning token index values T0-Tn to keywords 134, indexing scheme 101 converts queries 102 into expression trees 116. Indexing scheme 101 may use token index values T0-Tn to represent nodes 136 in query expression trees 116. For example, expression tree 1161 may use two of the same keywords 134A and 134B in query 102A. Indexing scheme 101 assigns nodes 136B and 136C token index values T0 and T1 associated with keywords 134A and 134B, respectively. Other nodes 136A and 136D in query trees 116 may identify logical operators from associated queries 102.

During a second document indexing stage 130, indexing scheme 101 assigns document index values D0-Dm to documents 112 retrieved from one or more data sources. For example, indexing scheme 101 may assign a zero or first address value D0 in document index 106 to a first document 112A and assign a one or next address value D1 to a next document 112B.

Indexing scheme 101 generates document-token index 104 based on document index 106 and token index 114. Document-token index 104 includes a list of token index values T0-Tn. Indexing scheme 101 identifies the keywords 134 located in each document 112 and assigns the document index values D0-Dm to the associated token index value T0-Tn in document-token index 104. For example, first document 112A may include keyword 134A in two locations. Indexing scheme 101 adds document index value D0 to token index value T0 and includes two offset values 132A identifying the two locations of keyword 134A within document 112A.

Indexing scheme 101 also may assign document index value D1 to token index value T0 for a second document 112B containing keyword 134A. Offset 132B identifies the location of keyword 134A within second document 112B. Similarly, indexing scheme 101 may assign document index value D1 to token index value T1 in index 104 when second document 112B also includes keyword 134B. Similar indexing is performed to identify each document 112 containing keywords 134 associated with token index values T0-Tn.

In one example, document indexing 130 is referred to as transient when documents are continuously or periodically uploaded and re-indexed in document index 106 and document-token index 104. In one example, token index 114 and expression trees 116 are referred to as non-transient when indexing scheme 101 repeatedly polls a same token index 114 and same expression trees 116 for a same set of queries 102 for applying to continuously uploaded (transient) document feeds.

Thus, indexing scheme 101 tokenizes each document and replaces each individual token with one or more indexes into document-token index 104. Assuming a first query 102 with the keywords "a b", a first document 112A encountered having the text "a b", would be tokenized into two separate tokens. Document-token index 104, at position 0, would reference back to the first document for token 0, at position 0 and another reference in the document index at position 1 representing token 1 would be stored for position 1 within the first document.

In some cases, one physical token may be translated into multiple separate tokens. For example, the text "a-b" may be turned into two separate tokens, "a" and "b", as well as another token "a-b", to further broaden document searches.

Figure 4:
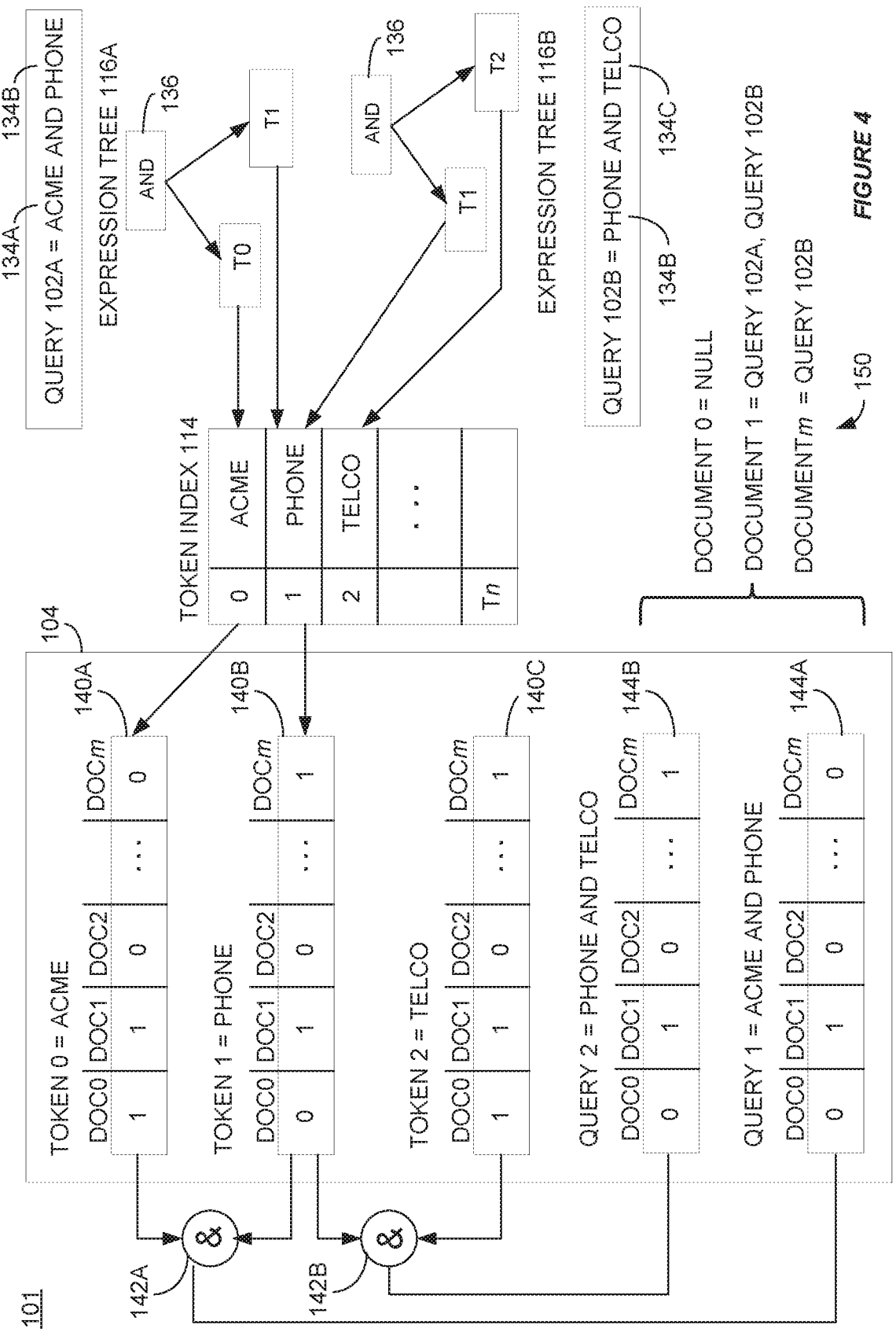
FIG. 4 shows an example data structure generated by the document-token indexing scheme.

FIG. 4 shows in more detail how indexing scheme 101 applies expression trees 116 to document-token index 104. Indexing scheme 101 may convert document-token index 104 into bit arrays 140. Each bit array 140 may be associated with a different token index value T0-Tn and each bit location in each bit array 140 may correspond with one of document index values D0-Dm for documents 112 (FIG. 3). For example, index scheme 101 may associate bit location 0 with document index value D0 and associate bit location m with document index value Dm. Indexing scheme 101 assigns logical 1 bit values to the bit locations to indicate which documents include the associated query keyword.

Index scheme 101 invokes multiple processing threads, each against a subset of the total query set available, to process queries 102. Each query evaluation is performed such that it outputs an array of Boolean values 144, where each Boolean result corresponds to a document with the same index in the indexed document set. If document Doc 0 matches the given query expression, then the bit at bit position 0 is set at the end of the query evaluation. Multiple separate bit arrays 144 are stored for post processing once all query threads have concluded.

Upon conclusion of the query threads, bit arrays 144 are iterated, and a mapping of document→list<query> is constructed, such that a document list 150 contains a list of positively matched queries 102. The resulting data structure is created by iterating bit array 144, and for each positive bit encountered, adding the query 102 associated with bit array 144 to the list 150 corresponding to the document for that bit location.

For example, indexing scheme 101 may generate a first bit array 140A for token index value T0 associated with the ACME keyword 134A, generate a second bit array 140B for token index value T1 associated with PHONE keyword 134B, and generate a third bit array 140C for token index value T2 associated with TELCO keyword 134C.

Indexing scheme 101 may assign logical 1 bit values to the first two bit locations in bit array 140A indicating documents D0 and D1 include ACME keyword 134A associated with token index value T0. Indexing scheme 101 may assign logical 1 bit values to the second and m bit locations in bit array 140B indicating documents D1 and Dm include the PHONE keyword 134B associated with token index value T1 and assign logical 1 bit values to the first, second and m bit locations in bit array 140C indicating documents D0, D1 and Dm include TELCO keyword 134C associated with token index value T2.

Indexing scheme 101 then applies logical operators to bit arrays 140 based on expression trees 116. For example, indexing scheme 101 converts query 102A into expression tree 116A identifying a logical AND of token index values T0 and T1. Accordingly, indexing scheme 101 performs a Boolean AND operation 142A on bit arrays 140A and 140B.

A resulting bit array 144A from AND operation 142A identifies any documents satisfying query 102A. For example, a logical 1 bit in the second bit location of bit array 144A indicates document D1 satisfies query 102A. In other words, document D1 includes both ACME keyword 134A and PHONE keyword 134B.

Similar Boolean operations are performed for expression trees 116 for other queries 102. For example, indexing scheme 101 performs a Boolean AND operation 142B between bit arrays 140B and 140C identified by expression tree 116B for query 102B. A resulting bit array 144B indicates document D1 and document Dm satisfy query 102B. In other words, documents D1 and Dm both include PHONE keyword 134B and TELCO keyword 134C. Indexing scheme 101 generates lists 150 from bit arrays 144 identifying the queries 102 satisfied by the same document.

Indexing scheme 101 sends the documents satisfying queries 102 to the associated user systems. For example, indexing scheme 101 does not send document D0 to any user system, sends documents D1 to the users associated with queries 102A and 102B, and sends document Dm to the user associated with query 102B.

Of course these are just examples and queries 102 may include any level of complexity with any number or types of keywords and logical operators. For example, logical operators 136 may include NOT operations. Indexing scheme 101 may invert bits for a particular bit array 140 associated with the NOT operation or may invert the results of a Boolean operation associated with the NOT operation.

In another example, queries 102 may specify a first keyword 134 within a specified number of words from a second keyword 134. Indexing scheme 101 may use offsets 132 in document-token index 104 (FIG. 3) to identify the distance between different keywords 134 in a document.

Indexing scheme 101 may identify the set of documents satisfying a particular query in a single Boolean operation compared with performing separate searches in m documents for n different queries. This allows indexing scheme 101 to more quickly identify documents within a larger document set that satisfy specific queries within a larger query set.

Figure 5:
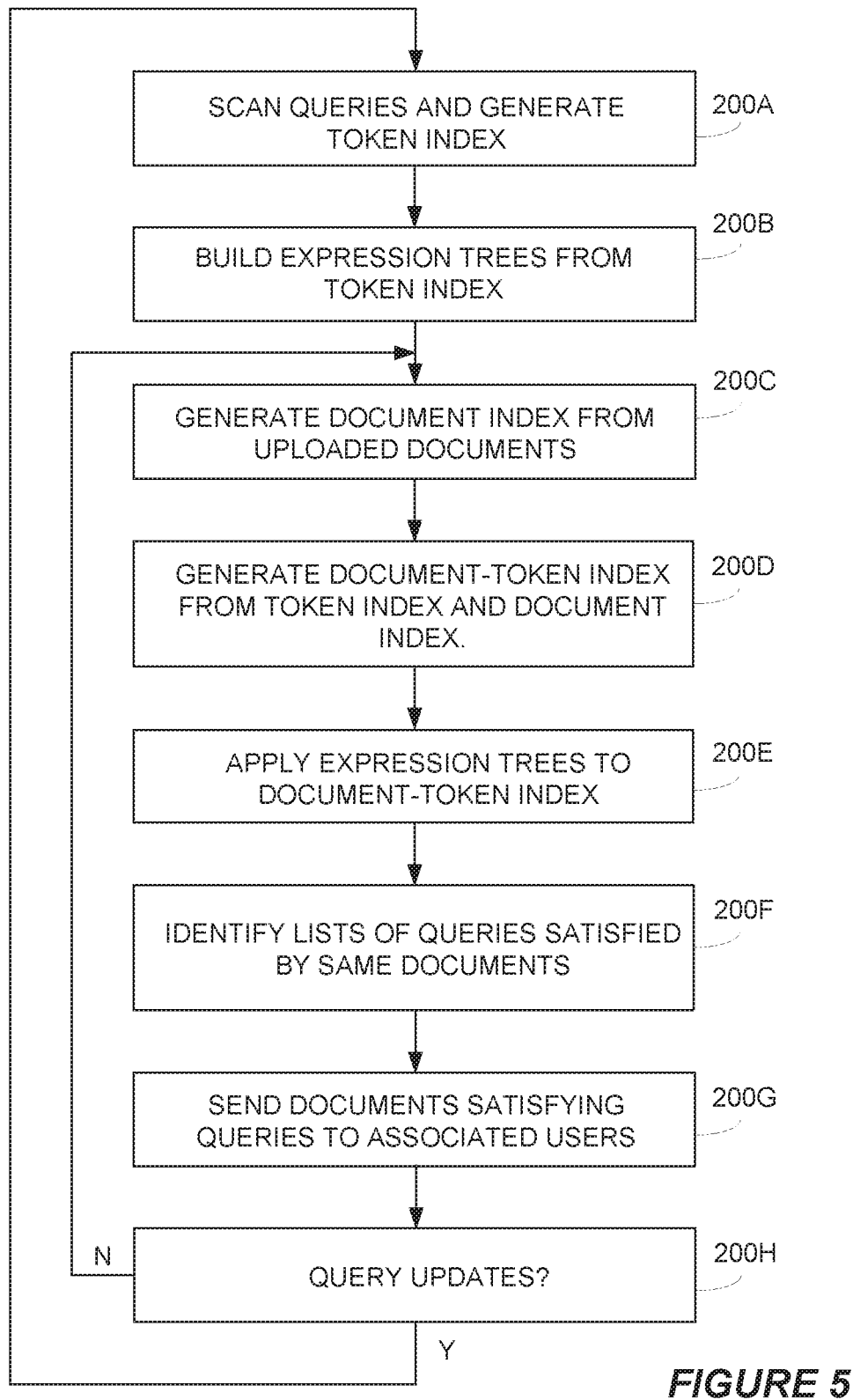
FIG. 5 shows an example process for optimizing content queries.

FIG. 5 shows an example process for the document-token indexing scheme. Operation 200A generates the token index. For example, the indexing scheme may identify individual keywords in the queries and assign each unique keyword a sequential unique token index value. For example, the first keyword in a first query is assigned token index value T0, and a second keyword in the first query is assigned token index value T1. Any subsequent instances of the first keyword in the first query or any other queries is assigned token index value T0 and any subsequent instances of the second keyword in the first query or any other queries is assigned token index value T1. A similar process is performed for all remaining keywords in the first query and then repeated for each additional query.

Operation 200B builds expression trees that replace the query keywords with the associated token index values and then links the token index values together based on logical operators in the queries. For example, the expression trees may include a hierarchy of nodes and branches comprising the token index values and logical operators.

Operation 200C generates a document index from uploaded documents. For example, the database system may receive documents from third party sources or via application program interfaces (APIs) that upload content from one or more data sources. As mentioned above, the documents may include social media posted by different users on one or more social media websites. For example, the documents may include social media messages extracted by a Twitter® firehose and/or by third party sources that scrape blogging websites. The indexing scheme assigns document index values to the documents, such as a zero or first address location to a first document and a next sequential value or address location to a second document, etc.

Operation 200D creates the document-token index. In one example, the document-token index may include bit arrays where each bit array is associated with a different token index value and every bit within the bit array is associated with a different uploaded document. As mentioned above, the bit value for a particular bit location in the bit array is set when the document associated with that bit location includes the keyword associated with the bit array.

Operation 200E applies the expression trees to the document-token index. For example, the indexing scheme identifies the bit arrays associated with the token index values in the expression trees. The indexing scheme then performs Boolean operations on the identified bit arrays corresponding with the logical operators in the expression trees. Results of the Boolean operations are a set of bits or a data structure identifying documents satisfying the associated query.

Operation 200F identifies all of the queries satisfied by a particular document. For example, the first bit location of each bit array result from operation 200E identifies all of the queries satisfied by the first document, and the second bit location of each bit array result from operation 200E identifies all of the queries satisfied by the second document, etc.

Operation 200G sends sets of documents satisfying the associated queries. For example, a set of 100 documents may satisfy a query submitted by a particular user. The database system operating the indexing scheme sends the 100 documents to the user system operated by that particular user.

Operation 200H check for any query updates. For example, the indexing scheme may identify new queries, deleted queries, or existing queries with modified keyword expressions. Operation 200H jumps back to operation 200A to update the token index with the new, deleted, or updated queries. Otherwise, operation 200H jumps back to operation 200C to generate or update the document index with any newly uploaded documents.

As mentioned above, the token index and query expressions are relatively non-transient and in one example are built less frequently than the rebuilt document index and rebuilt document-token index which are relatively transient and continuously rebuilt for each new set of uploaded documents.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A computer-implemented method for identifying documents associated with queries, comprising:
   identifying query expressions in the queries;
   generating a token index that associates token index values with keywords in the query expressions;
   generating expression trees for the queries, the expression trees using the token index values to represent the keywords in the query expressions;
   generating a document index that assigns document index values to the documents;
   identifying keywords from the query expressions contained in the documents;
   generating a document-token index that is derived from a combination of the token index and the document index that includes a list of the token index values and the document index values for the documents containing the keywords associated with the token index values; and
   using a processor, applying the expression trees to the document-token index that is derived from the combination of the token index and the document index to identify the documents satisfying the query expressions.

2. The method of claim 1, further comprising generating bit arrays for the token index values, bit locations in the bit arrays associated with different ones of the documents and bit values in the bit locations indicating which of the documents contain the keywords associated with the token index values.

3. The method of claim 2, further comprising:
   selecting one of the expression trees for a selected one of the queries;
   identifying the token index values for the selected one of the expression trees;
   identifying the bit arrays for the identified token index values;
   identifying logical operators for the selected one of the expression trees; and
   applying the logical operators to the identified bit arrays to identify the documents satisfying the query expression for the selected one of the queries.

4. The method of claim 1, further comprising:
   identifying a first set of unique keywords in a first one of the queries;
   assigning sequential token index values to the first set of unique keywords;
   assigning the keywords in a second one of the queries matching the keywords in the first one of the queries the same token index values;
   identifying a second set of unique keywords in the second one of the queries not matching keywords in the first one of the queries; and
   assigning additional sequential token index values to the second set of unique keywords.

5. The method of claim 1, wherein the keywords in the query expressions comprise text separated by logical operators.

6. The method of claim 1, further comprising:
identifying in the document-token index positions of the keywords within the documents; and
using the positions of the keywords to identify the documents satisfying the query expressions.

7. The method of claim 1, further comprising:
tokenizing the documents by replacing content in the documents matching the keywords in the query expressions with the associated token index values; and
using the tokenized documents to generate the document-token index.

8. The method of claim 1, wherein the documents include social media posted on social media websites.

9. The method of claim 1, further comprising:
repeatedly receiving additional documents;
repeatedly regenerating the document index and document-token index for the additional documents; and
repeatedly applying the expression trees to the regenerated document-token index to identify the additional documents satisfying the query expressions.

10. A database system for identifying content associated with queries, comprising:
a hardware processor; and
memory storing one or more stored sequences of instructions which, when executed by the processor, cause the processor to carry out the steps of:
generating a token index that associates token index values with keywords in the queries;
generating expression trees using the token index values to represent the keywords in the queries;
receiving content for applying to the queries;
generating a content index that assigns content index values to the content;
generating a content-token index that is derived from a combination of the token index and the content index that that associates the token index values with the content index values for the content containing the keywords associated with the token index values; and
applying the expression trees to the content-token index that is derived from the combination of the token index and the content index to identify the content satisfying the queries.

11. The database system of claim 10, wherein the instructions further cause the processor to carry out the steps of generating bit arrays for the token index values, bit locations in the bit arrays associated with different portions of the content and bit values in the bit locations indicating which portions of the content contain the keywords associated with the token index values.

12. The database system of claim 11, wherein the instructions further cause the processor to carry out the steps of:
identifying the token index values and logical operators in the expression trees;
selecting the bit arrays for the identified token index values; and
applying the identified logical operators to the selected bit arrays to generate a data structure identifying the portions of the content satisfying the queries.

13. The database system of claim 10, wherein the instructions further cause the processor to carry out the steps of:
identifying a first set of unique keywords in a first one of the queries;
assigning sequential token index values to the first set of unique keywords in the first one of the queries;
identifying additional keywords in the first one of the queries matching the first set of unique keywords;
assigning the same token index values to the additional keywords in the first one of the queries matching the first set of unique keywords;
assigning the same token index values to any of the keywords in a second one of the queries matching any of the keywords in the first one of the queries;
identifying a second set of unique keywords in the second one of the queries not matching any of the keywords in the first one of the queries; and
assigning additional sequential token index values to the second set of unique keywords in the second one of the queries.

14. The database system of claim 10, wherein the keywords in the queries comprise text separated by logical operators and the content includes messages posted on social media web sites.

15. The database system of claim 10, wherein the instructions further cause the processor to carry out the steps of identifying, in the content-token index, locations of the keywords within the content.

16. The database system of claim 10, wherein the instructions further cause the processor to carry out the steps of:
receiving additional content;
regenerating the content index and content-token index for the additional content; and
repeatedly applying the expression trees to the regenerated content-token index to identify the additional content satisfying the queries.

17. A content retrieval system, comprising:
a token index that associates keywords in queries with token index values;
a content index that associates with content index values;
a content-token index that is derived from a combination of the token index and the content index that associates the token index values with the content index values for the content containing the keywords associated with the token index values; and
a hardware processor using the content-token index that is derived from the combination of the token index and the content index to identify the content containing the keywords in the queries.

18. The content retrieval system of claim 17, wherein the content-token index includes bit arrays associated with the token index values, wherein bit locations in the bit arrays are associated with different portions of the content and bit values in the bit locations indicate which of the portions of the content contain the keywords associated with the token index values.

19. The content retrieval system of claim 18, further comprising:
expression trees using the token index values and logical operators to represent the queries, the hardware processor to:
identify the token index values in the expression trees;
select the bit arrays for the identified token index values; and
apply the logical operators to the identified bit arrays to generate a data structure to identify the content satisfying the queries.

20. The content retrieval system of claim 19, the hardware processor further to assign sequential token index values to unique sequential keywords in the queries.

* * * * *